United States Patent Office 3,371,062
Patented Feb. 27, 1968

3,371,062
ULTRAVIOLET STABILIZED ISOTACTIC POLYPROPYLENE
Leonard L. Curry, San Rafael, Calif., assignor to Chevron Research Company, a corporation of Delaware
No Drawing. Filed Apr. 6, 1965, Ser. No. 446,106
2 Claims. (Cl. 260—45.7)

ABSTRACT OF THE DISCLOSURE

Intimate mixtures of heptane-insoluble polypropylene and about 1 to 5 weight percent leafing aluminum powder. These mixtures are resistant to ultraviolet and oxidative degradation and thermal expansion.

---

This invention concerns novel aluminum-polypropylene compositions. More particularly, it relates to compositions comprising polypropylene and small amounts of aluminum leafing powder which are stable against sunlight degradation.

Unmodified polypropylene articles will upon prolonged exposure to sunlight be degraded by the ultraviolet portion of the sunlight. Ultraviolet degradation is manifested by a checking or crazing of the article surface causing the article to lose strength.

Previously, ultraviolet degradation has been curbed by incorporating carbon black into the polypropylene. In this manner polypropylene pipe, rope, fibers and other articles likely to be subjected to prolonged exposure to sunlight have been protected. The presence of carbon black, however, has several deleterious effects upon the article. First, the carbon black increases the heat absorption by the article and thereby promotes oxidative degradation. Oxidative degradation in turn causes surface checking and crazing. In addition, the presence of carbon black may cause linear thermal expansion which may cause the article to buckle.

In accordance with this invention, it has been found that compositions comprising isotactic polypropylene and, intimately dispersed therein, from about 1–5 weight percent leafing aluminum powder, based on the polypropylene, are not only resistant to ultraviolet degradation but are also stable against oxidative degradation and thermal expansion. Nonleafing aluminum powders, which have been disclosed as imparting protective qualities against sunlight in plastic materials such as cellulose acetate butyrate, when mixed with polypropylene provided little ultraviolet protection.

The polypropylene contemplated in this invention is that having at least 85% isotacticity and, more usually, at least 97% isotacticity. (By isotacticity is intended insolubility in refluxing heptane.) The intrinsic viscosity of the polypropylene will generally be in the range of about 2–4 dl./g., more usually, in the range of about 2–3 dl./g. (Decalin at 135° C.) Comparably, the melt flow rate will be in the range of about 0.1–12 gms. per ten minutes, more usually, in the range of about 0.5–10 gms. per ten minutes. (ASTM D238–57T, 2160 gms. load at 230° C.).

The aluminum constituent of the novel compositions is in the form of leafing aluminum powder. This form of aluminum is small, thin flakes of about 2 to 6 microns in diameter and about 0.02–0.05 micron thick coated with a suitable lubricant. In contrast with other aluminum powders, this form has the ability to orient in parallel layers of overlapping flakes thus producing a leaf-like appearance.

Conveniently, this leaf-type aluminum powder is made by ball milling atomized aluminum from granular form to leaf-like particles in the presence of a lubricant. After the ball milling the particles are polished by brushing.

The average mesh size of the particles will usually be between about 300–400 and the average leafing value of the powder will be between about 65–20% (ASTM D480–59T).

The polypropylene and leafing aluminum powder may be mixed in various ways prior to extrusion. For instance, the polypropylene in powder or pellet form and the aluminum powder may be mixed in an efficient melt mixer, such as a Banbury mixer. Alternatively, the leafing aluminum powder and polypropylene may be mixed in a powder mixer, such as the Prodex-Henschel mixer until the mixture is relatively homogeneous. Naturally small amounts of other materials may be added to the aluminum powder-polypropylene compositions to facilitate further processing, extrusion or injection molding.

The following examples illustrate the novel compositions of the invention and their stabilizing properties.

Example 1

A mixture of 97.5 parts extrusion grade polypropylene powder having a melt flow rate (MFR at 2160 grams) in the range of about 0.1–0.3 and containing 1.19 weight percent standard commercial molding and extrusion stabilizer system, based on the polypropylene, and 2.5 parts leafing aluminum powder (~400 mesh) were charged to a Banbury-type mixer and blended together for about 2–3 minutes after which the mixture had a uniform appearance.

Example 2

In the manner described in Example 1, a blend containing 97.5 parts of polypropylene having the same amount of the stabilizer system described in Example 1 and 2.5 parts of a ~325 mesh leafing aluminum powder was prepared.

Example 3—Ultraviolet degradation tests

The blends of Examples 1 and 2 together with similarly made blends of extrusion-grade polypropylene (MFR 0.1–0.3) and the standard stabilizer system and 2.25 weight percent carbon black (Elftex 8) were each separately fed to an Impco Injection Molder and were formed into test specimens. The injection molded specimens had the dimensions and shape as described in ASTM D638–60T. Each specimen was placed in an Atlas Twin Arc Weather-Ometer (Type D apparatus using a 102–18 cam; water spray at ambient temperatures) and tested according to ASTM method D42–57. Specimens were removed at approximately 250-hour intervals and examined microscopically for surface checking. The results of these tests are reported in Table I.

TABLE I

| Modifier | (Wt. percent) Modifier Conc. | No. of hours for checking |
| --- | --- | --- |
| None | | 450 |
| Carbon black | 2.25 | >980 |
| Aluminum leafing powder (325 mesh) | 2.5 | 980 |
| Aluminum leafing powder (400 mesh) | 2.5 | >980 |

Example 4

Thermal expansion tests were made on specimens made in the same manner as the specimens reported in Example 3. In these tests, the specimens were clamped parallel to a ½ inch aluminum rod with lattice support clamps holding each end of the specimen firmly in place. The specimens were then fastened to ringstands at a 45° angle and exposed to outdoor sunlight. The test was begun at 2 P.M. with an ambient temperature of ~90° F. The specimens were observed for 2 hours for linear expansion. After the 2-hour period, the surface temperature of each specimen was measured with an Alnor surface pyrometer.

Ambient temperature at this time was ~80° F. The results of these tests are reported in Table II below.

TABLE II

| Modifier (wt. percent) | Linear expansion | Surface Temp., ° F. after 2 hrs. |
|---|---|---|
| None, zero % | None | 80 |
| Carbon black, 2.5% | Bowed ¼ inch at midpoint from Al rod. | 88 |
| ~400 mesh leafing Al powder, 2.5%. | None | 82 |

*Example 5*

Oxidative stability tests were conducted on compression molded 20 mil sheet specimens made from blends prepared in the manner described in Example 1. Each of the sheets were placed in an oven at 155° C. and examined every 24 hours for surface crazing. The specimens were rated as failures when 10% of the surface had crazed. The results of these tests are reported below in Table III.

TABLE III

| Modifier (wt. percent): | Time to failure (hrs.) |
|---|---|
| None—0% | 190–200 |
| Carbon black—2.5% | 145–185 |
| ~400 mesh leafing Al powder—2.5% | 250–300 |

*Example 6—Brittle failure tests*

Blends of unmodified polypropylene, leafing Al powder-polypropylene, non-leafing Al powder-polypropylene and carbon-black-polypropylene were prepared in the manner described in Example 1. Extrusion-grade polypropylene (MFR 0.1) containing the standard stabilizer system was used.

Each blend was formed into sheets having a thickness of about 10 mils by compression molding. Specimens of 2 inches by 4 inches in size were cut from these sheets and were placed in an "Atlas-Fade-Ometer" apparatus with one carbon arc operating according to ASTM D42–57, resulting in a test temperature of about 130–140° F. The time to brittle failure as determined by bending of the specimens to break was determined for each specimen. The results for each blend containing modifier at the indicated amount are reported in Table IV.

TABLE IV

| Modifier | Wt. Percent Modifier | Time to Brittl Failure (hrs.) |
|---|---|---|
| None | 0 | 655 |
| Channel-type carbon black | 5 | (¹) |
| Non-leafing Al powder | 1 | 444 |
| Do | 5 | 1,110 |
| Leafing Al powder | 1 | 2,000 |
| Do | 5 | (¹) |

¹ No failure at 4,000.

As will be evident to those skilled in the art, various modifications on this process can be made or followed, in the light of the foregoing disclosure and discussion, without departing from the spirit or scope of the disclosure or from the scope of the following claims.

What is claimed is:

1. A composition comprising polypropylene having at least 85% isotacticity and intimately dispersed therein from about 1 to 5 weight percent leafing aluminum powder, said powder being coated with a suitable lubricant and having the ability to orient in parallel layers of overlapping flakes.

2. The composition according to claim 1 wherein said leafing aluminum powder has a mesh size from about 300–400.

References Cited

UNITED STATES PATENTS 2,878,145   3/1959   Aid et al. _____ 260—41

FOREIGN PATENTS 632,028   1/1962   Italy.

OTHER REFERENCES

Yigmund et al., Chem. Abs., vol. 59, 1841 de, 1963.

DONALD E. CZAJA, *Primary Examiner.*

M. J. WELSH, *Assistant Examiner.*